United States Patent Office 3,506,490
Patented Apr. 14, 1970

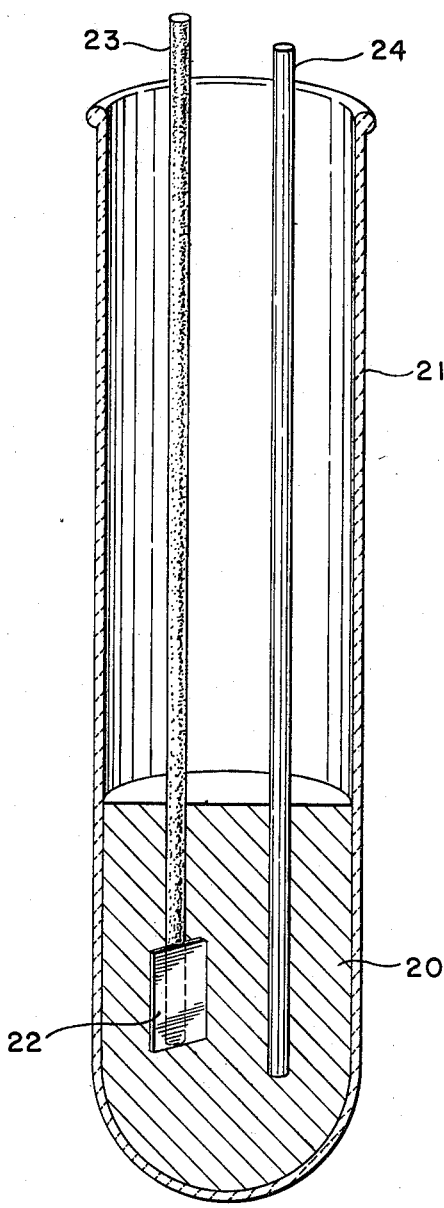

3,506,490
SOLID ELECTROLYTE BATTERY HAVING
LITHIUM OR LITHIUM ALLOY ANODE
Edward S. Buzzelli, Solon, Ohio, assignor to The Standard Oil Company, Cleveland, Ohio, a corporation of Ohio
Filed May 8, 1968, Ser. No. 727,405
Int. Cl. H01m 11/00, 43/00, 43/06
U.S. Cl. 136—6                                   7 Claims

ABSTRACT OF THE DISCLOSURE

A secondary electrical energy storage battery consisting of a lithium or a lithium alloy anode, a tungsten or a molybdenum cathode, and a mixed electrolyte of lithium sulfate and lithium halide salts. The preferred embodiment exploits the solid state feature of the electrolyte. Capacity of this battery is in excess of 100 watt-hours per pound.

---

This invention relates to a secondary or a rechargeable electrical energy storage system which is characterized by a solid state electrolyte. More specifically, the system comprises a mixed electrolyte consisting essentially of lithium sulfate and lithium halide salt or salts, a lithium or a lithium alloy anode, and a tungsten or a molybdenum cathode. The term "lithium halide salts" includes lithium chloride and lithium bromide.

With the advent of the motor vehicle pollution age, a great deal of effort has been dedicated to the development of non-polluting systems for propelling vehicles. One of such systems is the subject of this disclosure, although not limited or restricted in application to vehicle propulsion.

Generally speaking, energy can be stored electrostatically, as in a capacitor unit, or chemically, as in an electrical energy storage device or battery. Both of such means of energy storage, however, are unsuitable for continuous commercial use involving a constant electrical energy drain in that the former, while permitting a quick charge and discharge, suffers from an insufficient electrical storage capacity; while the latter, although much superior with respect to the electrical storage capacity because of its high power delivery and slow discharge, suffers by virtue of its protracted charging rate. An ideal electrical energy storage device, therefore, combines the quick charge characteristic of the capacitor with the slow discharge and high electrical energy storage capacity of the battery.

The device of the present invention combines the enviable characteristics of a relatively quick charge, in the range of about half an hour to two hours; a relatively high electrical storage capacity, on the order of 100 watt-hours per pound; and a solid state electrolyte.

The solid state electrolyte must satisfy three main criteria. First, the material must conduct electricity primarily by ions rather than by electrons. Conduction by electrons lowers the voltage of a galvanic cell below that predicted from thermodynamic calculations. Secondly, the solid electrolyte must be fairly inert to the materials in a cell, especially if any of such materials should happen to be in a liquid state at the operating temperature. A reactive layer would interfere with the operation of electrochemical cell and excessive corrosion would severely limit the life of the cell and thereby decrease its utility substantially. Thirdly, the solid electrolyte must not be porous since penetration by a liquid electrode would short out the circuit.

A solid state electrolyte battery has a number of important advantages. Since the electrolyte remains solid at the operating temperature, no leakage or sealing problems are encountered. Although seemingly superficial, the sealing problem can be a major obstacle. Sealing of batteries utilizing corrosive molten alkali salt electrolytes has been a major problem, which as yet has not been completely solved. With a solid electrolyte, the interelectrode distance can be reduced to a minimum, thus reducing the internal resistance and size of the battery. Since the solid electrolyte is interposed between opposing electrodes, the necessity for an electrode spacer is obviated, thus disposing of another problem which can be a source of considerable intrigue, as those skilled in the art recognize. Being in the solid state, the electrolyte is relatively non-corrosive, thus insuring lasting structural integrity of the related components.

The solid state electrolyte in the herein described electrical energy storage system is a mixture of salts. The mixture includes lithium sulfate and a lithium halide, such as lithium chloride or lithium bromide, or a mixture of such lithium halides with lithium sulfate. The composition of the mixed salt electrolyte may vary from 10 to 95 mole percent lithium sulfate. In this composition range, the mixed salt electrolyte conducts in what appears to be a solid phase at temperatures as low as about 400° C.

Lithium sulfate has a unique property of ionizing below its melting point and becoming electrically conducting. This transition occurs at about 575° C. and is accompanied by a crystal change from monoclinic to cubic. The result of the crystal phase change is the precipitation of lithium ions which facilitate ionic conductivity. Since lithium ions in the crystal structure of lithium sulfate are electrical conductors, the electrical resistance of the monoclinic lithium sulfate declines as the crystal phase change shifts to the cubic form. The electrical resistance of lithium sulfate declines logarithmically with increase in temperature and at about 575° C., there is a four to five order of magntiude drop over a small temperature range of about 50° C.

Lithium sulfate melts at 860° C., while lithium bromide and lithium chloride melt at 547° C., and 614° C., respectively. At the operating temperatures, which will generally be upwards of about 400° C. and below the melting point of lithium sulfate, the mixed electrolyte presents an appearance of a solid mass. It is not known whether the halide salts exist in the solid state or melt and form pools or rivulets within the solid lithium sulfate. It is also unknown what contribution, if any, lithium sulfate makes to the conduction function of the mixed electrolyte at operating temperatures which are below the transition temperature. It seems that in the temperature range below the transition point, lithium sulfate serves merely as a matrix for the lithium halide salts.

Prior to its use as an electrolyte, lithium sulfate must be dried to remove moisture. A technique which is effective in dehydrating lithium sulfate involves melting the hydrated lithium sulfate in an evaporating dish and cooling it to room temperature. This simple operation produces a dry solid lithium sulfate that does not readily pick up water from the air. For example, a sample of lithium sulfate, dehydrated in the manner described above, was found to contain 2 percent of water after having been exposed to air for two weeks.

Ovshinsky U.S. Patents 3,201,736 and 3,271,584 disclose a scheme of depositing lithium sulfate upon a matrix of a higher melting material for the purpose of maintaining the electrolyte as a whole in the solid state. As the solid electrolyte, consisting of the mixed lithium salts deposited on a matrix of a higher melting material, is heated above its melting point, the molten lithium salts form small pools or rivulets within the matrix so that the electrolyte structure as a whole remains a solid mass with pools or rivulets of molten lithium salts contained therein for conducting the current flow. The same principle can be applied to the herein disclosed electrolyte consisting of mixed salts.

Although the advantages of the solid state electrolyte will not inhere, the mixed electrolyte can be utilized in the molten state.

The anode comprises lithium or a lithium alloy such as aluminum-lithium, indium-lithium, tin-lithium, lead-lithium, silver-lithium, copper-lithium, etc. Ternary lithium alloys can also be used. The preferred anode is the highly reversible aluminum-lithium electrode. The lithium or lithium alloy anode can function in solid or liquid form, depending on the temperature at which the system is operated. When the temperature is above the melting point of the anode, the solid state electrolyte can be utilized to contain the liquid anode. Handling of the lithium alloy anode must be conducted under an inert atmosphere to inhibit oxidation.

The aluminum-lithium anode can be produced by combining lithium with aluminum and thus producing a preformed alloy of aluminum and lithium, or, alternatively, electrochemically, by charging a substantially pure aluminum bar in an electrolyte containing lithium ions to the extent of about one amp-hour per gram of aluminum, whereby lithium is diffused into the aluminum bar.

The solid aluminum-lithium alloy anode comprises aluminum and incidental impurities in amounts of from about 70 to 95 weight percent based on total composition, and from about 5 to 30 weight percent lithium. The lithium composition is critical. At 5 percent of lithium and below, the capacity is inadequate for practical purposes while above 30 percent lithium, the discharge is not flat but a gradient downward. Incidental impurities such as for example copper, magnesium, manganese, indium, and iron may be present in amount of less than 10 weight percent. An anode consisting entirely of lithium can also be utilized, however, because of its low melting point, i.e., 186° C., it will be liquid at the operating temperature and its discharge will be gradient downward.

The aluminum-lithium electrode is capable of storing lithium metal from the electrolyte without forming an extensive liquid. Hence, at an operating temperature below its melting point, the electrode remains solid and is capable of diffusing the lithium metal from electrolyte through its structure. It has been found that on charging the cell comprising the aluminum-lithium electrode, the electrode expands, whereby the lithium metal from electrolyte enters the electrode structure. On discharge, the lithium metal leaves the electrode structure, resulting in its contraction. As is evident, the electrode structure must be able to withstand the stresses of expansion and contraction and for this reason, the aluminum-lithium electrode is preconditioned prior to use.

The preconditioning takes the form of slow charge and slow discharge of the electrode. This slow preconditioning results in an electrode of substantially uniform aluminum-lithium distribution which facilitates take-up and release of the lithium metal upon subsequent fast charge and fast discharge of the electrode. If the initial charge and discharge preconditioning cycles are carried out too rapidly, local regions of liquid are built up resulting in pitting of the electrode. This pitting of the electrode is deleterious in that it promotes cracking and general deterioration of the electrode. Evidence of pitting is visible in the form of lithium agglomeration. Aluminum-lithium electrode cycled by slow charge and discharge shows a fine uniform distribution of the lithium metal in the aluminum. The aluminum-lithium anode-alkali halide molten salt system is more fully described in U.S. patent application Ser. No. 518,473 filed Jan. 3, 1966, now U.S. Patent No. 3,445,288.

The aluminum-lithium electrode is characterized as a constant potential electrode. This means that when aluminum-lithium electrode is charged to a potential which must of necessity be below the decomposition potential of the particular electrolyte in the system, the discharge should be at a constant voltage until the very end when the system becomes fully depleted. In actual practice, however, it has been found that the aluminum-lithium electrode does not discharge at a constant potential. The potential drop of the electrode is a gradient downwardly. This problem has been solved by removing the surface film from the electrode in an inert atmosphere and maintaining the electrode in an inert atmosphere or submerged in an inert hydrocarbon until it is ready for use. Removal of surface film as described, will result in an aluminum-lithium electrode which is truly a constant potential electrode. The procedure for removing the surface film from an aluminum-lithium electrode is more fully described in U.S. patent application Ser. No. 550,239 filed on May 16, 1966.

During advancement studies of the aluminum-lithium electrode, it was observed that dendrites gradually developed on the electrode during charge-discharge cycling. Dendritic growth proceeded outwardly from the face of the aluminum-lithium electrode and towards the opposing cathode. When dendritic growth was allowed to continue to grow, the growth formed a bridge between electrodes resulting in the short-circuiting of the electrical storage system. This problem has now been solved by circumscribing the aluminum-lithium electrode with a mechanical screen. This screen is from about 100 mesh to 20 mesh, and provides between 15 and 35 percent open area. U.S. patent application Ser. No. 518,113 filed Jan. 3, 1966, now U.S. Patent No. 3,428,493 constitutes a complete disclosure relating to the provision of a screen on the aluminum-lithium electrode.

Opposed to the lithium or lithium alloy anode is a tungsten or a molybdenum cathode. With respect to tungsten, the cathode can consist solely of tungsten, tungsten halide or halides, or tungsten compositions with other electrically conductive materials. The molybdenum cathode can likewise consist solely of molybdenum and/or molybdenum compounds in combination with other electrically conductive materials. Examples of the electrically conductive material are carbon, graphite, boron carbide, silicon carbide, tungsten carbide, petroleum coke and generally conductive carbides, silicides, oxides of metals, and nitrides stable in the environment of the device at the operating conditions.

The cathode can be used in the form of plates, rods, screens, etc. Where the cathode material is particulate, a binder such as carbonized phenolic resin or carbonized coal tar pitch, is used in the molding operation.

The tungsten and molybdenum component of the cathode can vary from about 5 weight percent to substantially pure metal, the balance being the electrically conductive material. Molybdenum and tungsten concentrations of about 40 to 60 weight percent, based on total electrode composition, are favored, however, substantially pure tungsten and molybdenum form the preferred embodiments of the cathode.

Where particulate material is used to manufacture a cathode, the material is generally blended with a binder and compressed at a temperature of 50–100° C., or above the flow temperature of the binder, if used, and at a pressure of 1000–50,000 p.s.i. Higher pressures provide greater active electrode content per unit volume of electrode. The maximum pressure limit is determined by the desired porosity in the finished electrode.

After pressing, in the case where a binder is used, the cathodes are heated in an inert atmosphere at a temperature of 100–1200° C., to cure and bake the binder. Inert gas, such as argon, helium or nitrogen, is used to control oxidation. During the heating period, considerable $CO_2$ and $CO$ are evolved which impart a porous character to the electrode. The electrode structure thus formed is strong and electrically conductive.

The cathode may also be prepared by hot pressing, or sintering. Sintering is used herein to designate the state of the metal in which its particles begin to fuse without any appreciable change in their shape or form. The particles become sticky and stick together, and upon cooling, remain so. In general, the temperature of sintering is such that the particles begin to coalesce, forming a coherent body with voids between individual particles.

Any method of electrode fabrication which produces porous material is satisfactory. The porosity should be in the range of 15 to 70 percent in the fully discharged or reduced state, and the voids between the particles should be large enough to permit the electrolyte to enter freely.

Other starting materials and methods of electrode preparation are contemplated. For example, by the method of volatile compound deposition, a tungsten or a molybdenum halide, in one of its higher oxidized states, is heated to an elevated temperature whereupon it is reduced and deposited on a porous support, such as carbon, in a less volatile state. Other volatile compounds, such as tungsten and molybdenum carbonyls, may be used in a similar manner.

By the method of vapor deposition, an electrical potential is established between a substantially pure tungsten or molybdenum block heated to about 3000° C. and an ambient temperature substrate, both maintained in a vacuum. Tungsten or molybdenum vapor is thus deposited on the substrate.

It is also possible to impregnate an inert substrate with a tungsten or molybdenum containing solution, such as ammonium tungstate or ammonium molybdate. A cathode is produced by drying and vaporizing the solvent.

Precursors, such as the disulfides, can likewise be used in preparing cathodes. The precursor is contacted with a halogen at a temperature of about 100–200° C. Halogen replaces the sulfide and a usable cathode is thus produced.

Still other methods of cathode preparation can also be used. Although different starting materials and different methods of preparation may be employed, the finished product is a tungsten and/or tungsten halide or a molybdenum and/or molybdenum halide cathode.

Before the particular cathode electrode can be used in an electrical energy storage device, the electrodes must be preconditioned, i.e., easily degradable components in the structure must be removed and the electrode must become permeated with electrolyte. Therefore, prior to commercial operation of the electrical energy storage device, th cathodes are alternately charged positively and negatively. The preconditioning of the electrodes involves immersing the electrodes in an alkali or an alkaline earth metal halide electrolyte and charging the electrodes to oxidize the tungsten and molybdenum with halide ions and discharging to reduce the tungsten and molybdenum halides.

The maximum voltage for the unit cell described above is limited to the decomposition potential of the electrolyte, i.e., about 3.2 volts for lithium sulfate. To assemble an electrical energy storage device capable of delivering higher voltages, it would only be necessary to stack several unit cells in series, as is well known in the art.

A heating means is provided for the purpose of converting the electrolyte from a non-conducting to a conducting state. Once the storage device is started and is in normal operation, no external heat is usually necessary to maintain it in operating condition. Insulation is of course provided for the purpose of conserving heat. With a particular insulation, the electrolyte can be maintained in a molten condition for over sixty hours thus dispensing with the necessity of reheating the electrolyte to bring it up to the operating condition.

A conventional manner of assembling an electrical storage cell is to position anode and cathode in spaced, face-to-face relationship, and to dispose electrolyte between and in contact with the electrodes. There is a gamut of variations of the conventional cell. The electrolyte can be deposited as a thin film on the surface of one of the electrodes or it can be disposed on a matrix, as was already described. The electrodes can be used in the form of sheets, screens, plates, or they can be deposited on a matrix or as a thin film on opposing faces of the electrolyte. This disclosure is not intended to cover all possible variations nor is it intended to limit the instant invention to the specific embodiments disclosed.

EXAMPLE I

Electrolyte 20, consisting of 43.55 grams of lithium sulfate and 12.50 grams of lithium bromide, was melted at 700° C. in a 200 mm. x 38 mm. Vycor® test tube 21. A 0.045-gram piece of molybdenum 22 was cemented to a graphite rod 23 using a conducting carbon cement. The molybdenum was in a sheet form, 0.001 inch in thickness and measuring 0.50 inch x 0.75 inch. The molybdenum cemented to the end of the graphite rod was gradually lowered into the test tube to allow uniform heating of the cement and the graphite rod. An aluminum rod 24, ⅛ inch in diameter, was thrust into the melt near the solidification point of the electrolyte.

The cell was then charged and discharged a number of times. The operating temperature was maintained at about 480° C. Since the aluminum rod was not charged separately, many cycles were required to charge it with sufficient amount of lithium. After 37 cycles of charging at a constant voltage of 2.35 volts and for a duration of one-half hour, and discharging at 5 ma. down to 0.7 volt, a discharge was obtained which yielded a capacity of 0.16 watt-minute per gram of the cathode, or 0.6 amp-hour per inch$^3$ of the cathode. The plot of the last discharge, volts versus time, disclosed two discernible plateaus.

EXAMPLE II 23.15 grams of lithium sulfate and 7.55 grams of lithium bromide were melted in a 200 mm. x 38 mm. Vycor® test tube. As the melt cooled, a pair of rods were thrust thereinto—one, a tungsten rod ⅛ inch in diameter and the other, an aluminum rod ⅜ inch in diameter. The melt was then cooled to 560° C. at which temperature it solidified.

The cell was charged at 100 ma. for an hour and then discharged at 10 ma. to 1.1 volts. The duration of this discharge was about seven minutes. A typical tungsten discharge plot was obtained, with plateaus at 2.6 volts, 1.95 volts, and 1.8 volts. The cell was then cycled automatically, charging at constant voltage of 2.9 volts for one-half hour and discharging to 1.0 volt at 10 ma.

On the 20th cycle, the capacity was 0.06 watt-hour per gram or 1.0 amp-hour per inch$^3$ of cathode. On the 34th cycle, the capacity was 0.03 and 0.5, respectively. The operating temperature was maintained at about 500° C.

EXAMPLE III

A sample consisting of 20.55 grams of lithium sulfate and 7.14 grams of lithium bromide was placed into a 200 mm. x 38 mm. Vycor® test tube and melted at 700° C. When the melt was cooled to 600° C., 1.73 grams of bismuth and 1.51 grams of indium were added thereto. The metals melted and formed a small pool at the bottom of the test tube. A stainless steel current carrier wire was thrust into the metal pool and a tungsten rod was thrust into the melt to a depth of about ½ inch. The tungsten rod was 0.040 inch in diameter.

The cell was cooled to 550° C. to solidify the salt mixture and then charged at 2 volts for one-half hour and discharged at 5 ma. Upon charging, lithium entered the bismuth-indium pool, which remained liquid at the operating temperature, to form a bismuth-indium-lithium alloy. This alloy served as the anode of the cell. After 40 of such charge-discharge cycles, the capacity was 4.1 watt-minutes per gram of 2.1 amp-hours per inch$^3$ of the cathode.

EXAMPLE IV

A disk electrolyte was fabricated from a mixture of 60 percent $Li_2SO_4$ plus 40 percent LiBr using a ¾-inch mold with 6000 p.s.i. The disk was white in color and fairly strong. Two openings were bored into the disk with an ⅛-inch drill, and an aluminum rod and a tungsten rod were inserted into the openings to serve as electrodes. One-fourth inch length of the electrodes was in contact with the electrolyte. The cell was then heated to 500° C. in an argon atmosphere and then repeatedly charged and discharged. The cell was discharged for one hour above 1 volt at 20 ma.

EXAMPLE V

In this experiment, a lithium-aluminum anode and a tungsten cathode were immersed in a pre-electrolyzed electrolyte mixture of 20 mole percent lithium sulfate and 80 mole percent lithium bromide. The cell was operated at 485° C., at which temperature the electrolyte remained in the solid state. At 10 ma. constant current discharge, the capacity was 2.3 amp-hours per $inch^3$ of the cathode.

EXAMPLE VI

A cell was assembled by immersing a lithium-aluminum anode and a tungsten cathode into a pre-electrolyzed electrolyte mixture of 10 mole percent of lithium sulfate and 90 mole percent lithium bromide. The electrolyte remained in the solid state at the operating temperature of 500° C. The capacity of the cell was 0.85 amp-hour per $inch^3$ of the cathode at a constant current discharge of 10 ma.

I claim:

1. A rechargeable electrical energy storage battery operable below the melting point of lithium sulfate comprising an anode consisting of lithium and lithium alloys, a cathode selected from the group consisting of molybdenum and tungsten in opposed spaced relationship to said anode, and a solid electrolyte consisting essentially of lithium sulfate and a lithium halide interposed between said anode and said cathode and being in contact therewith.

2. Battery of claim 1 wherein said lithium halide is selected from the group consisting of lithium chloride, lithium bromide, or a mixture of lithium chloride and lithium bromide.

3. Battery of claim 2 wherein said anode is aluminum-lithium alloy.

4. Battery of claim 3 wherein the composition of said alloy is about 5 to 30 weight percent lithium.

5. Battery of claim 2 wherein said electrolyte is disposed on a matrix of a higher melting point than said electrolyte.

6. Battery of claim 2 wherein the composition of said electrolyte is 10 to 95 mole percent lithium sulfate.

7. A rechargeable electrical energy storage battery operable under an inert atmosphere and below the melting point of lithium sulfate comprising an aluminum-lithium alloy anode consisting essentially of 5 to 30 weight percent lithium and the remainder being aluminum, a cathode selected from the group consisting of tungsten and molybdenum in opposed spaced relationship to said anode, and an electrolyte consisting essentially of lithium sulfate and a lithium halide selected from the group consisting of lithium chloride, lithium bromide, and a mixture of lithium chloride and lithium bromide, said electrolyte being in the solid state at the operating temperature of said battery.

References Cited

UNITED STATES PATENTS

| | | | |
|---|---|---|---|
| 2,937,219 | 5/1960 | Minnick et al. | 136—6 |
| 3,043,896 | 7/1962 | Herbert et al. | 136—6 |
| 3,160,531 | 12/1964 | Spindler | 136—120 |
| 3,236,694 | 2/1966 | Stenger et al. | 136—100 |
| 3,410,730 | 11/1968 | Rightmire et al. | 136—100 |
| 3,410,731 | 11/1968 | Rightmire et al. | 136—100 |
| 3,445,288 | 5/1969 | Buzzelli | 136—6 |

ALLEN B. CURTIS, Primary Examiner

A. SKAPARS, Assistant Examiner

U.S. Cl. X.R.

136—83, 153